United States Patent
Fontaine

(10) Patent No.: US 7,970,863 B1
(45) Date of Patent: Jun. 28, 2011

(54) USING A HOME-NETWORKING GATEWAY TO MANAGE COMMUNICATIONS

(75) Inventor: Jean-Emmanuel Fontaine, Vienna, VA (US)

(73) Assignee: AOL, Inc., Dulles, VA (US)

( * ) Notice: Subject to any disclaimer, the term of this patent is extended or adjusted under 35 U.S.C. 154(b) by 1325 days.

(21) Appl. No.: 10/746,560

(22) Filed: Dec. 29, 2003

(51) Int. Cl.
  *G06F 15/16* (2006.01)
(52) U.S. Cl. ......... 709/218; 709/217; 709/219; 709/232
(58) Field of Classification Search .......... 709/217–219, 709/230–233
  See application file for complete search history.

(56) References Cited

U.S. PATENT DOCUMENTS

| | | | |
|---|---|---|---|
| 5,831,971 A | | 11/1998 | Bonomi et al. |
| 5,933,603 A | * | 8/1999 | Vahalia et al. ................. 709/225 |
| 6,023,456 A | * | 2/2000 | Chapman et al. ............. 370/252 |
| 6,182,094 B1 | * | 1/2001 | Humpleman et al. ........ 715/513 |
| 6,212,569 B1 | | 4/2001 | Cashman et al. |
| 6,233,389 B1 | | 5/2001 | Barton et al. |
| 6,310,886 B1 | | 10/2001 | Barton |
| 6,327,418 B1 | | 12/2001 | Barton |
| 6,385,647 B1 | * | 5/2002 | Willis et al. ................... 709/217 |
| 6,567,423 B1 | | 5/2003 | Iyer |
| 6,859,438 B2 | * | 2/2005 | Haddock et al. .............. 370/235 |
| 7,139,834 B1 | * | 11/2006 | Albanese et al. ............. 709/238 |
| 7,257,218 B2 | * | 8/2007 | Yoakum ................... 379/265.01 |
| 7,343,567 B2 | * | 3/2008 | Mann et al. ................... 715/826 |
| 7,707,273 B2 | * | 4/2010 | Jones ............................ 709/219 |
| 2002/0013852 A1 | * | 1/2002 | Janik ............................ 709/231 |
| 2002/0150044 A1 | | 10/2002 | Wu et al. |
| 2003/0083870 A1 | | 5/2003 | Lee et al. |
| 2003/0085888 A1 | | 5/2003 | Lafruit |
| 2003/0093563 A1 | | 5/2003 | Young et al. |

FOREIGN PATENT DOCUMENTS

| | | |
|---|---|---|
| EP | 0 835 037 | 4/1998 |
| WO | WO 00/18108 | 3/2000 |

OTHER PUBLICATIONS

B. Braden, et al., "Recommendations on Queue Management and Congestions Avoidance in the Internet," Request for Comment 2309 (RFC 2309), World Wide Web Consortium, Apr. 1998, pp. 1-17.
Floyd, S., and Jacobson, V., "Random Early Detection Gateways for Congestion Avoidance," *IEEE/ACM Transactions on Networking*, Aug. 1993, pp. 1-22.
"Most Popular FAQs," TiVo.com, 3 pages.
"TiVo Raises the Bar for Personal TV with Delivery of Industry's First Interactive Video Program," *PR Newswire*, Jun. 7, 2000, 3 pages.
"TiVo, Inc. Debuts TView, a Revolutionary Distributed Television Viewing Management Platform for the TV Industry," *Business Wire*, Dec. 21, 1998, 2 pages.

(Continued)

*Primary Examiner* — Joseph Thomas
*Assistant Examiner* — Lashanya R Nash
(74) *Attorney, Agent, or Firm* — Finnegan, Henderson, Farabow, Garrett & Dunner, L.L.P.

(57) ABSTRACT

Techniques are provided for managing communications from an external computer system to a gateway device on a home network. Content is downloaded to the home network, stored on the home-networking gateway and then made available to a device on the home network that is capable of using the stored content. Additionally, a home-networking gateway manages communications between external computer systems and the home network to give priority to human interactive communications over the downloading of entertainment content for future use.

27 Claims, 6 Drawing Sheets

OTHER PUBLICATIONS

"TiVo Announces Availability of RCA Personal Video Recorders with the TiVo(R) Service," *PR Newswire*, Oct. 19, 2000, 2 pages.
"ESPN Motion," ESPN Internet Ventures, 2003, 3 pages.
Jin, C., et al., "Fast TCP: From Theory to Experiments," http://netlab.caltech.edu/FAST/, Mar. 30, 2003, pp. 1-11.
"Technology—Internet Report: New System Could Speed Up Internet Downloads," *Yahoo! News*, Jun. 20, 2003, 3 pages.
"ESPN Motion VideoScout," *ESPN Insider*, Jun. 16, 2003, 2 pages.
Olsen, Stefanie, "Disney to 'push' ABC over the Net," CNET News.com, Jun. 12, 2003, 3 pages.

* cited by examiner

USING A HOME-NETWORKING GATEWAY TO MANAGE COMMUNICATIONS

TECHNICAL FIELD

This description relates to using a home-networking gateway to manage communications with data sources that are external to a home network.

BACKGROUND

In a home network of computing devices, each of several networked devices may have particular components or capabilities for performing one or more functions. One of the devices in the home network may be connected to a communications pathway through which computer systems external to the home network are accessible. The external communications pathway may be used to provide entertainment content and other types of content to the home network. The process of providing content from an external system to a device on the home network may be referred to as downloading content. The use of the external communications pathway to download entertainment content to the home network may interfere with another activity for which the external communications pathway is required, such as exchanging electronic mail messages or browsing content.

SUMMARY

In one general aspect, communications with data sources for the delivery of entertainment content to a home network are managed. A home-networking gateway receives, from a first device over an internal communication pathway, a request for entertainment content, the request for entertainment content specifying a particular external computer system from which the entertainment content is to be accessed. The home-networking gateway also receives, from a second device over the internal communications pathway, a second request for access to an external computer system such that the second request comprises a human interactive request. The home-networking gateway determines that the second request is a human interactive request and prioritizes the human interactive request over the entertainment content request.

Implementations may include one or more of the following features. For example, the home-networking gateway may determine that the second request is a human interactive request based on the content of the second request, the format of the second request or the device that sent the second request to the home-networking gateway.

The home-networking gateway also may request transmission of the requested entertainment content from the particular external computer system, receive the entertainment content from the particular external computer system, and store the entertainment content on a data storage unit of the home-networking gateway. In response to the receipt through the internal communication pathway of a request to use the entertainment content, the home-networking gateway may provide the entertainment content to a device that sent the request to use the entertainment content.

The home-networking gateway may prioritize the human interactive request over the entertainment content request by increasing the period of time between receiving a portion of entertainment content and sending an acknowledgement of the receipt of the portion of entertainment content. When processing of the human interactive request is complete, the home-networking gateway may reduce the period of time between receiving a portion of entertainment content and sending an acknowledgement of the receipt of the portion of entertainment content.

The home-networking gateway also may prioritize the human interactive request over the entertainment content request by stopping transmission of entertainment content until processing of the human interactive request is complete. When processing of the human interactive request is complete, the home-networking gateway may start transmission of entertainment content until processing of the human interactive request is complete.

Implementations of the techniques discussed above may include a method or process, an apparatus or system, or computer software on a computer-accessible medium, or any combination of systems, methods, and computer software.

The details of one or more implementations is set forth in the accompanying drawings and the description below. Other features will be apparent from the description and drawings, and from the claims.

DETAILED DESCRIPTION

Techniques are provided for managing communications from an external computer system to a gateway device on a home network. Content is downloaded to the home network, stored on the home-networking gateway, and then made available to a device on the home network that is capable of using the stored content. This may be referred to as store-and-forward communication. Using store-and-forward communications for content delivery to the home network may improve the quality and/or the timing of entertainment content delivery to the home network.

Additionally, a home-networking gateway manages communications between external computer systems and the home network to give priority to communications of a human interactive process over the downloading of entertainment content for future use. This may reduce the degree that the entertainment content download interferes with other types of communications that use the external communications pathway. One type of communications, for example, may be a type of process in which a user uses a device connected to the home network to send communications over the home network and waits for a response to the sent communications. This type of communication may be referred to as a human interactive process or a human-generated process. Examples may include a user exchanging instant messages with another user located outside of the home, using an online function or program of an external computer system, searching external computer systems for information, browsing information (such as a web page) located on an external computer system, or real-time streaming of video or audio (such as may occur when a person is watching video being stream from the external computer system to the home).

Figure 1:
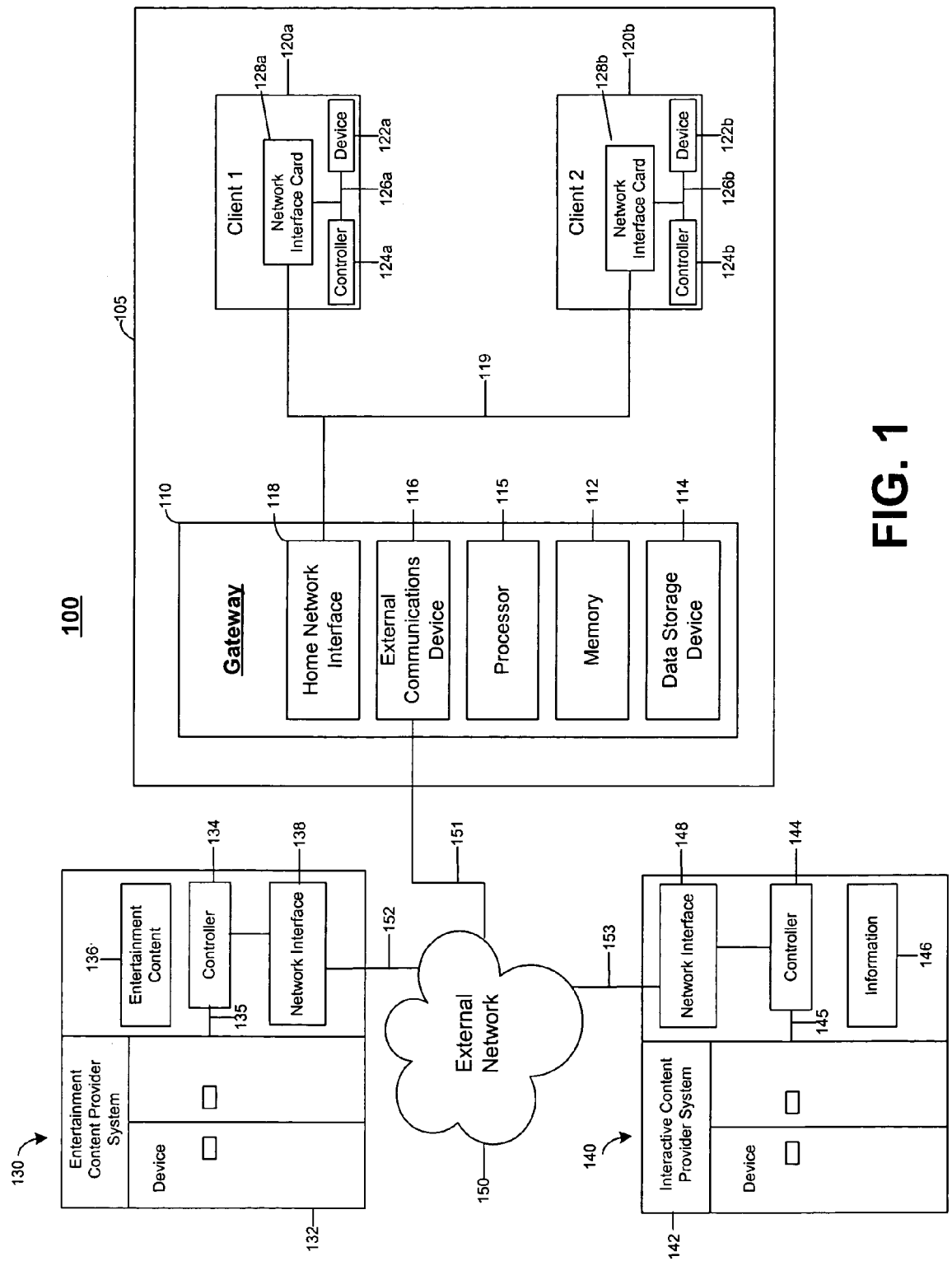
FIG. 1 is a block diagram of a system capable of using a home-networking gateway to manage communications with data sources that are external to a home network.

Referring to FIG. 1, a communications system 100 is capable of managing communications using an external communications pathway. In particular, the communications system 100 is capable of delivering and exchanging data between a home-networking system 105 and external systems 130 and 140 so as to give priority to a human interactive process over a process to download entertainment content to the home-networking system 105. One of the external systems is an entertainment content provider system 130 capable of providing entertainment content, such as movies and music, to other computer systems. The other external system is an interactive content provider system 140 that is capable of providing information, such as a web page, in response to a user query sent through a browser application.

The home-networking system 105 includes a home-networking gateway 110 and clients 120a and 120b. The home-networking gateway 110 may be a communications gateway, a router, or another type of communications device capable of directing and exchanging messages with other devices and systems. The home-networking gateway 110 may include a firewall or other security techniques to inspect incoming messages and approve or reject messages to protect the home-networking gateway 110. The home-networking system 105 is capable of delivering and exchanging data with each of the entertainment content provider system 130 and the interactive content provider system 140 over an external network 150.

The home-networking gateway 110 includes memory 112, a data storage device 114, a processor 115, an external communications device 116 and a home-network interface 118. The memory 112 and the data storage device 114 each store machine-executable instructions, data, and various programs, all of which may be processed by the processor 115. In contrast to the memory 112, the data storage 114 device persistently stores data. Each computer program may be implemented in a high-level procedural or object-oriented programming language, or in assembly or machine language if desired; and, in any case, the language may be a compiled or interpreted language. The memory 112 may include random access memory (RAM) and/or read-only memory (ROM). The data storage device 114 may be any form of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

The external communications device 116 enables communications between the home-networking gateway 110 and the external systems 130 and 140. The external communications device 116 may be a satellite modem, an analog modem, a cable modem, a DSL (Digital Subscriber Line) modem, or another type of communications device capable of transmitting and receiving communications using the external network 150.

The home-network interface 118 enables communications between the home-networking gateway 110 and the clients 120a and 120b. The home-network interface 118 provides a physical connection to, and directs communications using, the home network communications pathway 119, which may be a wired or wireless pathway.

The clients 120a and 120b each include one or more client devices 122a and 122b and/or client controllers 124a and 124b. For example, the client system 120a or 120b may include one or more general-purpose computers (e.g., personal computers), one or more special-purpose computers (e.g., devices specifically programmed to communicate with each other and/or the client system 120a or 120b), or a combination of one or more general-purpose computers and one or more special-purpose computers.

Each of the client devices 122a and 122b includes one or more of a keypad, a keyboard, a pointing device or another type of input device, a display, an input/output unit, a central processing unit (CPU), a memory, and a data storage device (none of which are shown). Each of the client devices 122a and 122b is capable of executing instructions under the command of the client controller 124a or 124b, respectively. The client device 122a or 122b is connected to the client controller 124a or 124b by a pathway 126a or 126b that is capable of delivering data. Each of the communications pathway 126a or 126b may be a wired pathway, a wireless pathway, or, when the client controller 124a or 124b is a software application loaded on the client device 122a or 122b, a virtual pathway.

Each of the client devices 122a or 122b and each of the client controllers 124a or 124b includes one or more hardware components and/or software components. An example of a client device 122a or 122b is a general-purpose computer capable of responding to and executing instructions in a defined manner. Other examples include a special-purpose computer, a workstation, a server, a device, a component, other physical or virtual equipment, or some combination thereof capable of responding to and executing instructions.

An example of client controller 124a or 124b is a software application loaded on the client device 122a or 122b for commanding and directing communications enabled by the client device 122a or 122b. Other examples include a program, a piece of code, an instruction, a device, a computer, a computer system, or a combination thereof, for independently or collectively instructing the client device 122a or 122b to interact and operate as described. The client controller 124a or 124b may be embodied permanently or temporarily in any type of machine, component, physical or virtual equipment, storage medium, or propagated signal capable of providing instructions to the client device 122a or 122b.

Each of the client 120a and 120b includes a network interface controller 128a or 128b that provides a physical connection to, and directs communications using, the home network communications pathway 119.

Other examples of the client 120a or the client 120b include a personal digital assistant (PDA), a portable personal music device, a stereo system, a personal digital recorder and player, a TV set-top box, a game device, or another type of device, a component, other physical or virtual equipment, or some combination of these elements capable of responding to and executing instructions in compliance with the system architecture.

The entertainment provider system 130 typically includes one or more entertainment content provider devices 132 and/or entertainment content provider controllers 134. For example, the entertainment content provider system 130 may include one or more general-purpose computers, one or more special-purpose computers (e.g., devices specifically programmed to communicate with each other and/or the entertainment provider system 130), or a combination of one or more general-purpose computers and one or more special-purpose computers. The entertainment content provider system 130 may be arranged to operate within or in concert with one or more other systems, such as, for example, one or more LANs ("Local Area Networks") and/or one or more WANs ("Wide Area Networks").

The entertainment content provider device 132 includes one or more input devices (such as a keypad, a keyboard, or a pointing device), a display, an input/output unit, a central processing unit (CPU), a memory, a data storage device, and a broadband communications device (none of which are shown). The entertainment content provider device 132 is generally capable of executing instructions under the command of an entertainment content provider controller 134. The entertainment content provider device 132 is connected to the entertainment content provider controller 134 by a wired, wireless or virtual data pathway 135 capable of delivering data.

Each of the entertainment content provider device 132 and the entertainment content provider controller 134 typically includes one or more hardware components and/or software components. An example of an entertainment content provider device 132 is a general-purpose computer capable of responding to and executing instructions in a defined manner. Other examples include a special-purpose computer, a workstation, a server, a device, a component, other physical or virtual equipment, or some combination thereof capable of responding to and executing instructions.

An example of the entertainment content provider controller 134 is a software application loaded on the entertainment content provider device 132 for commanding and directing communications enabled by the entertainment content provider device 132. Other examples include a program, a piece of code, an instruction, a device, a computer, a computer system, or a combination thereof, for independently or collectively instructing the entertainment content provider device 132 to interact and operate as described. The entertainment content provider controller 134 may be embodied permanently or temporarily in any type of machine, component, physical or virtual equipment, storage medium, or propagated signal capable of providing instructions to the entertainment content provider device 132.

The entertainment content provider system 130 includes entertainment content 136. The entertainment content 136 may include, for example, movies, music, and photographs that are available for download from the entertainment content provider system 130. The entertainment content provider system 130 includes a network interface controller 138 that provides a physical connection to, and directs communications using, an external network communications pathway 152.

The interactive content provider system 140 typically includes one or more interactive content provider devices 142 and/or interactive content provider controllers 144. For example, the interactive content provider system 140 may include one or more general-purpose computers, one or more special-purpose computers (e.g., devices specifically programmed to communicate with each other and/or the interactive content provider system 140), or a combination of one or more general-purpose computers and one or more special-purpose computers. The interactive content provider system 140 may be arranged to operate within or in concert with one or more other systems, such as, for example, one or more LANs ("Local Area Networks") and/or one or more WANs ("Wide Area Networks").

The interactive content provider device 142 includes one or more input devices (such as a keypad, a keyboard, or a pointing device), a display, an input/output unit, a central processing unit (CPU), a memory, a data storage device, and a broadband communications device (none of which are shown). The interactive content provider device 142 is generally capable of executing instructions under the command of an interactive content provider controller 144. The interactive content provider device 142 is connected to the interactive content provider controller 144 by a wired, wireless or virtual data pathway 145 capable of delivering data.

Each of the interactive content provider device 142 and the interactive content provider controller 144 typically includes one or more hardware components and/or software components. An example of an interactive content provider device 142 is a general-purpose computer capable of responding to and executing instructions in a defined manner. Other examples include a special-purpose computer, a workstation, a server, a device, a component, other physical or virtual equipment or some combination thereof capable of responding to and executing instructions.

An example of the interactive content provider controller 144 is a software application loaded on the interactive content provider device 142 for commanding and directing communications enabled by the interactive content provider device 142. Other examples include a program, a piece of code, an instruction, a device, a computer, a computer system, or a combination thereof, for independently or collectively instructing the interactive content provider device 142 to interact and operate as described. The interactive content provider controller 144 may be embodied permanently or temporarily in any type of machine, component, physical or virtual equipment, storage medium, or propagated signal capable of providing instructions to the interactive content provider device 142.

The interactive content provider system 140 includes information 146. Examples of information include web pages or other formats of content that may be accessible through the external network 150. For example, searchable information 146 may be an online dictionary or encyclopedia from which desired information may be identified and provided to a device of the home network system 105. The interactive content provider system 140 also includes a network interface controller 148 that provides a physical connection to an external network communications pathway 153.

The external network 150 is capable of making a direct or indirect communications connection between the home-networking gateway 110, the entertainment content provider system 130, and the interactive content provider system 140, irrespective of physical separation. The external network 150 may be a WAN, a LAN, an analog or digital wired and wireless telephone network, radio, television, cable, satellite, and/or another type of delivery mechanism for carrying data. The data may be carried over a wired, wireless or virtual pathway.

In one example, the home-networking gateway 110 establishes a connection with the entertainment provider system 130 through the external network 150 and begins to download entertainment content 136 for storage in persistent data storage device 114. The home-networking gateway 110 initiates the download process based on receiving a request from a user or based on, for example, the occurrence of a predetermined date and time.

In one example, before all of the entertainment content 136 has been received and stored, a user of one of the clients 120a or 120b sends a request to the home-networking gateway 110 to establish a connection with the interactive content provider system 140. In response, the home-networking gateway 110 prioritize the user's request to access the interactive content provider system 140 over the process to download the entertainment content 136. The home-networking gateway 110 then interrupts, or slows down, the downloading of the entertainment content to enable the user to access communications pathways 151 and 153 over the external network 150. To do so, the home-networking gateway 110 may use various dynamic traffic management techniques, which also may be referred to as traffic shaping techniques, to control the connection with the external system. Examples of dynamic traffic management techniques include the adjustment of quality of service (QoS) parameters and/or traffic descriptors included in messages sent using the Asynchronous Transfer Mode (ATM) protocol. The prioritization of the human interactive process over the download of the entertainment content may help minimize the negative impact of the download process on the user's communication exchange with the interactive content provider system 140.

Once the user has completed exchanging communications with the interactive content provider system 140, the home-networking gateway 110 re-starts, or speeds up, the download of the entertainment content, such as by adjusting parameters for the connection to the entertainment content provider system 130.

When all of the entertainment content 136 has been received and stored in the data storage device 114 of the home-networking gateway 110, the home-networking gateway 110 may send a notification that the entertainment content 136 has been downloaded and is available for use by a device in the home-networking system 105. For example, the home-networking gateway 110 may send an electronic mail message or an instant message to a particular user account or may display an alert or message on one of the clients 120a or 120b. A user of client 120a or 120b then is able to use the entertainment content, such as by playing or viewing the content, through the network pathway 119 between the client device 120a or 120b and the home-networking gateway 110.

Thus, the home-networking gateway 110 uses both dynamic traffic shaping and store-and-forward communications techniques to download of high-quality entertainment content from an external system for later viewing while minimizing the impact of the downloading on an interactive user experience. These communications technique may be particularly useful when the home-network communications pathway 119 is capable of supporting high-resolution entertainment content (such as a DVD-quality movie) and the external pathways 151 and 152 from the external network 150 to the home-networking gateway 110 are not able to do so. In addition, the use of a store-and-forward communications technique that minimizes the interruption of a user's interactive experience may help to create or invigorate an online digital movie delivery service in which a user may selects a movie for later viewing.

In some cases, a store-and-forward capability can be implemented on one of the clients 120a or 120b, particularly when the client has sufficient storage capability (such as when the client 120a or 120b is a personal computer). The implementation of the store-and-forward capability on the home-networking gateway 110 may be advantageous. In particular, because the home-networking gateway 110 is used to manage communications with the external network 150, the home-networking system 105 is able to prioritize requests from different devices for access to the external network 150 using external communications pathway 151.

Figure 2A:
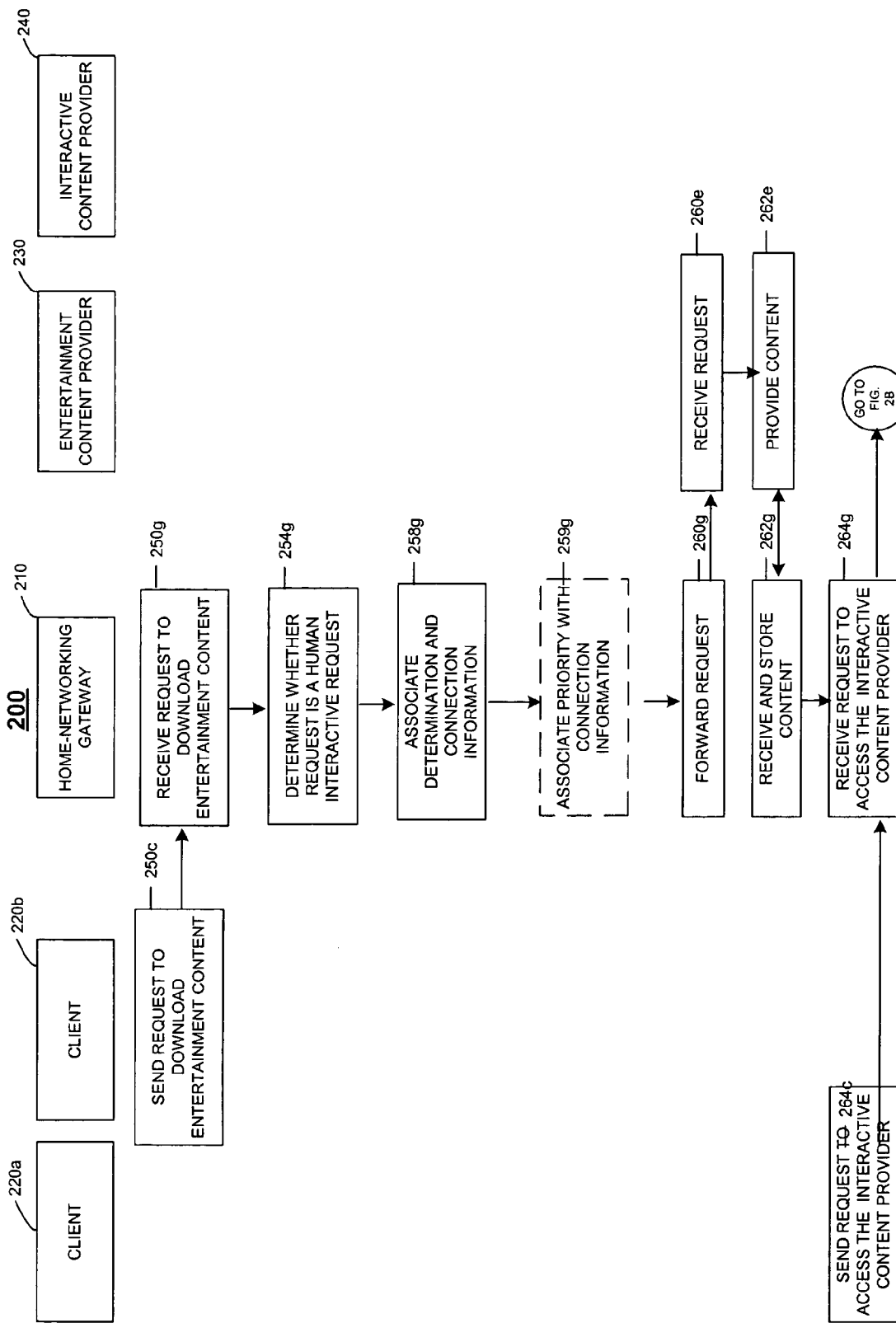
FIGS. 2A, 2B, 3 and 4 are flow charts of processes for using a home-networking gateway to manage communications to give priority to communications of a human interactive process over communications of an entertainment content download process.
Figure 2B:
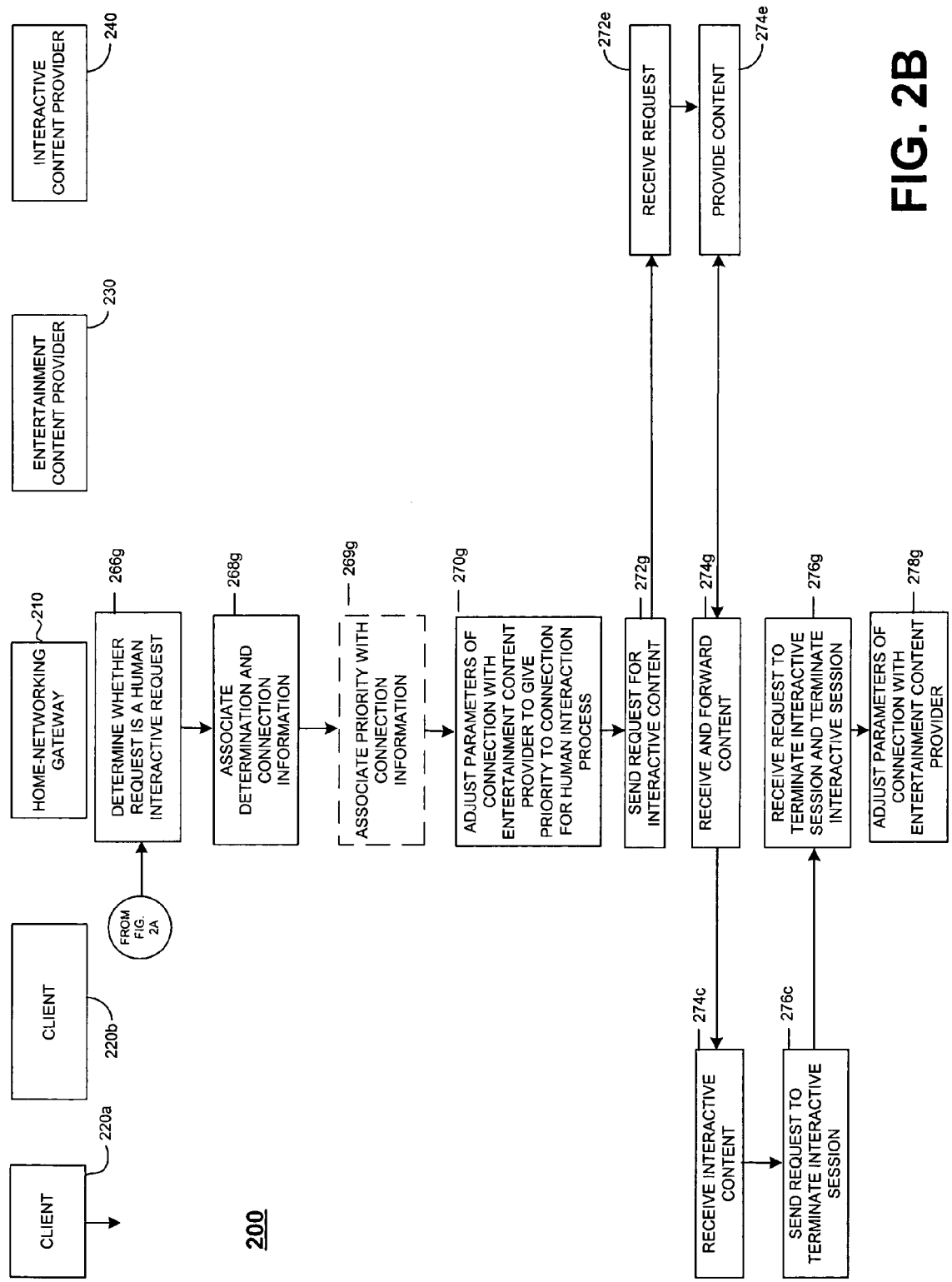

FIGS. 2A and 2B show a communication process 200 using client devices 220a and 220b, home-networking gateway 210, and external systems 230 and 240 that are accessible to devices on a home network through an external computer network, as previously described with respect to FIG. 1. Using the process 200, the home-networking gateway 210 manages communications with external systems 230 and 240 to give priority to communications of a human interactive process over communications of an entertainment content download process. In particular, the home-networking gateway 210 uses the process 200 to give priority to communications for a human interactive process between the client device 220a and an interactive content provider system 240 over communications with the entertainment content provider system 230 for an entertainment content download process.

The process 200 begins when the client 220b sends to the home-networking gateway 210 a request to download entertainment content (step 250c). This may be accomplished, for example, by a user using client 220b to initiate a computer program (such as a browser application) to access the entertainment content provider system 230 to start the process of downloading entertainment content for later use. Alternatively, a scheduling program on client 220b may send the request to download entertainment content based on the occurrence of a predetermined date and time.

The home-networking gateway 210 receives the request to download entertainment content (step 250g). Then the home-networking gateway 210 determines whether the request is a human interactive request (step 254g). This may be accomplished, for example, by inspecting the content and/or the format of the request. For example, a request that uses a particular protocol (such as the hypertext transfer protocol (HTTP) or secure HTTP (HTTPS)) may be identified as originating from a browser program. Similarly, a request that uses a protocol used for voice messaging (such as the Session Initiation Protocol (SIP)) may be identified as a human interactive request.

In another example, a gaming device may use a particular message format or may send a request to a particular communication port on the home-networking gateway 210 so as to allow the home-networking gateway 210 to detect that the request was sent from a gaming device. When the request is for voice messaging or originates from a gaming device, the request is determined to be a human interactive request. When the request originates from a browser program, the home-networking gateway 210 may classify the request as a human interactive request based on the external computer system to be accessed. For example, when the request is sent to an external computer system that has been predetermined to be a source of downloadable entertainment content, the home-networking gateway may determine the request to be other than a human interactive request. To make this determination, the home-networking gateway 210 may determine that the uniform resource locator (URL) or another type of address for the entertainment content provider system 230 is present on a table or a list maintained by the home-networking gateway 210 that identifies sources of downloadable entertainment content. If so, the home-networking gateway 210 determines that the request from the browser program is not a human interactive request. In contrast, when the home-networking gateway 210 determines that the request originates from a browser program and the destination URL is not identified as a source of downloadable entertainment content, the home-networking gateway 210 determines that the request is a human interactive request.

In the example of the process 200, the home-networking gateway 210 determines that the request from client 220b is not a request for a human interactive process and is a request to download entertainment content. The home-networking gateway 210 then associates the determination with information identifying or relating to the communications session (step 258g). For example, the home-networking gateway 210 may store the association in a table or list of connections for communications sessions, as illustrated in Table 1.

TABLE 1

| Communications Session | Client | Type | Priority |
| --- | --- | --- | --- |
| Connection to Entertainment Content Provider System | Client 220b | Entertainment Content Download | Low |
| Connection to Interactive Content Provider | Client 220a | Human Interactive Request | High |

The home-networking gateway 210 optionally may associate a priority value with the connection to the entertainment content provider system 230 for use by the client 220b (step 259g). The priority value is based on whether the process using the connection is a human interactive process. If so, the home-networking gateway 210 assigns a higher priority to the process than when the connection is used for a process to download entertainment content or another type of process that is not a human interactive process. The use of a priority attribute may be useful to distinguish between different types of human interactive requests. For example, communications from a browser application to a search engine at an external computer system may be given a higher priority than communications from a gaming device.

The home-networking gateway 210 forwards the request for entertainment content to the entertainment content provider system 230 (step 260g), which receives the request (step 260e) and starts to send requested entertainment content to the home-networking gateway 210 (step 262e). The home-networking gateway 210 receives and stores the content from the entertainment provider system 230 (step 262g).

While the home-networking gateway 210 is exchanging communications with the entertainment content provider system 230, the client 220a sends to the home-networking gateway 210 a request for interactive content from the interactive content provider system 240 (step 264c). The home-networking gateway 210 receives the request for interactive content from the client 220a (step 264g).

The home-networking gateway 210 determines whether the request is a human interactive request (step 266g), as described previously with respect to step 254g. Here, the home-networking gateway 210 determines that the request is a human interactive request because the request originated from a browser program and did not identify a system identified as a system having downloadable entertainment content. The home-networking gateway associates the determination with information about the connection to the interactive content provider 240 for use by the client 220a (step 268g) and, optionally, associates a priority with the connection information (step 269g).

At this point in process 200, the home-networking gateway 210 is exchanging communications with the entertainment content provider system 230 and has received a human interactive request for content from the interactive content provider system 240. In response to the request, the home-networking gateway 210 adjusts the parameters of the connection with the entertainment content provider to give priority to the connection for the human interactive request (step 270g). For example, the home-networking gateway 210 may the adjust one or more quality of service (QoS) parameters and/or traffic descriptors included in messages sent using the Asynchronous Transfer Mode (ATM) protocol.

The home-networking gateway 210 sends to the interactive content provider system 240 the human interactive request from client 220a (step 272g). The interactive content provider system 240 receives the request for interactive content (step 272e) and provides the interactive content to the home-networking gateway 210 (step 274e). The home-networking gateway 210 receives and forwards the content to the client 220a (step 274g). The client 220a receives the interactive content (steps 274c) and sends to the home-networking gateway 210 a request to terminate the interactive communication session with the interactive content provider system 240 (step 276c).

The home networking gateway 210 receives the request to end the session and does so (step 276g). To do so, the home-networking gateway 210 may exchange one or more messages with the interactive content provider system 240. After the connection with the interactive content provider system 240 has been terminated, the home-networking gateway 210 adjusts the connection parameters of the connection with the entertainment content provider system 230 to increase the rate at which entertainment content is downloaded (step 278g).

Once the downloading of the entertainment content is complete, the entertainment content stored on the home-networking gateway 210 is available to be used by a device connected to the home network.

In some implementations, the home-networking gateway 210 may provide priority to a human interactive process by sending an explicit pause message to the entertainment content provider 230 to stop the transmission of entertainment content before establishing a connection for a human interactive process. When the human interactive process is complete, the home-networking gateway 210 sends an explicit resume message to the entertainment content provider 230 to resume the transmission of the entertainment content.

Alternatively or additionally, the home-networking gateway 210 may provide priority to a human interactive process by modifying the timeliness of acknowledgement messages sent in the connection used to transmit the entertainment content. By increasing the time between receipt of a portion of the entertainment content and sending of an acknowledgement message for the received portion of the entertainment content, the home-networking gateway 210 can slow down the rate at which the entertainment content provider 230 sends the entertainment content when the entertainment content provider system 230 waits for acknowledgement of one portion of the entertainment content before sending the next portion of the entertainment content. As the time delay increases between receiving a portion of entertainment content and the sending of the associated acknowledgement, the rate of transmission decreases, which, in turn, provides increases the amount of the bandwidth of the network connection available to the human interactive process. Once the human interactive process is complete, the home-networking gateway 210 speeds up transmission of the entertainment content by acknowledging receipt of the entertainment content without delay.

In some implementations, the home-networking gateway 210 may provide priority to a human interactive process in an manner other than by performing an action. In one example, a connection to an external computer system may expire if no communications are received from the home-networking gateway 210 in a predetermined amount of time. In such a case, the home-networking gateway 210 may provide priority to a human interactive process by ceasing communication with the external computer system which, in turn, causes a disruption of transmission of the entertainment content. When the human interactive process is complete, the home-networking gateway may reestablish communications with the external computer system.

In another example, an external computer system may only send each portion of entertainment content in response to a request for a portion from the home-networking gateway 210. To provide priority to a human interactive process, the home-networking gateway does not request another portion of the entertainment content until the human interactive process is complete.

Figure 3:
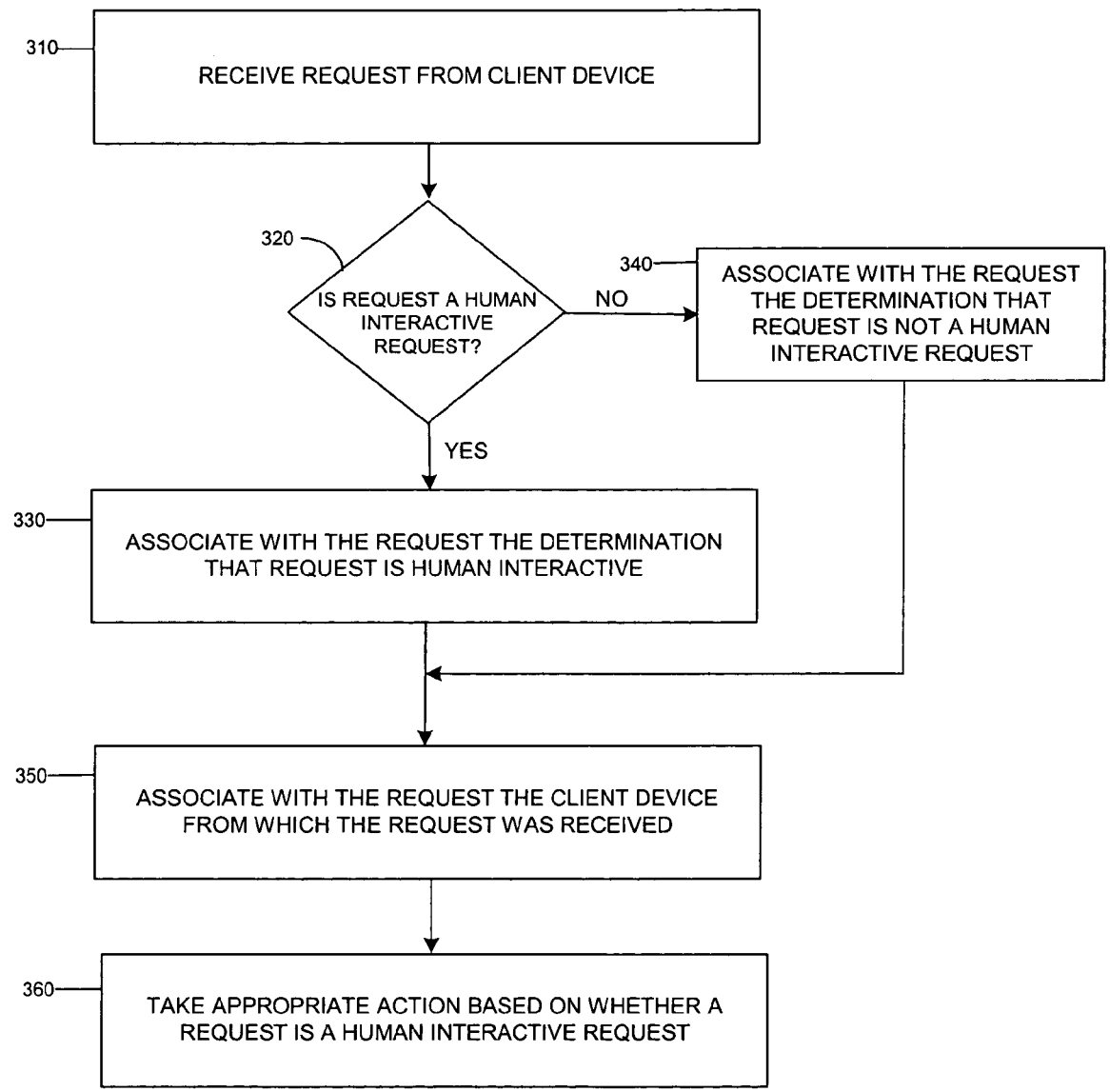

FIG. 3 illustrates a process 300 that may be used by a home-networking gateway to manage communications with a data source external to a home network. In general, the home-networking gateway uses the process 300 to give priority to a request by a human interactive process over a request from another type of process.

The process 300 begins when the home-networking gateway receives a request from a client device for access to an external data source, such as a computer system located outside of the residence in which the home network is located (step 310). The home-networking gateway determines whether the request is a human interactive request (step 320). This may be accomplished, for example, based on the content and/or form of the request or based on determining the device that sent the request, as described previously.

When the request is related to a human interactive process (step 320), the home-networking gateway associates this with the request (step 330). In contrast, when the home-networking gateway determines that the request is not related to a human interactive process (step 320), the home-networking gateway associates this with the request (step 340). The determination of whether a request is related to a human interactive process may enable the home-networking gateway to prioritize requests that are received such that requests associated with human interactive processes are processed in preference over other types of requests. This, in turn, may enable the home-networking gateway to manage communications with external data sources such that the degree of interference with a human interactive process from downloading entertainment content is reduced.

Based on whether the request is associated with a human interactive process, appropriate action is taken to give priority to human interactive requests (step 365). The home-networking gateway, for example, determines the action or actions to be taken based on (1) whether a received request is a human interactive request and (2) whether the request being processed is a human interactive request. When a received request is a human interactive request and the request in process is not a human interactive request, the home-networking gateway pauses or slows down the request being processed to execute the human interactive request, as described previously. In contrast, when the received request is a human interactive request and the request being processed also is a human interactive request, the request being processed is not paused or slowed down, and the home-networking gateway processes the received request after the request being processed is complete. Similarly, when the received request is not a human interactive request, the request being processed is not paused or slowed down, and the home-networking gateway processes the received request after the request being processed is completed.

Figure 4:
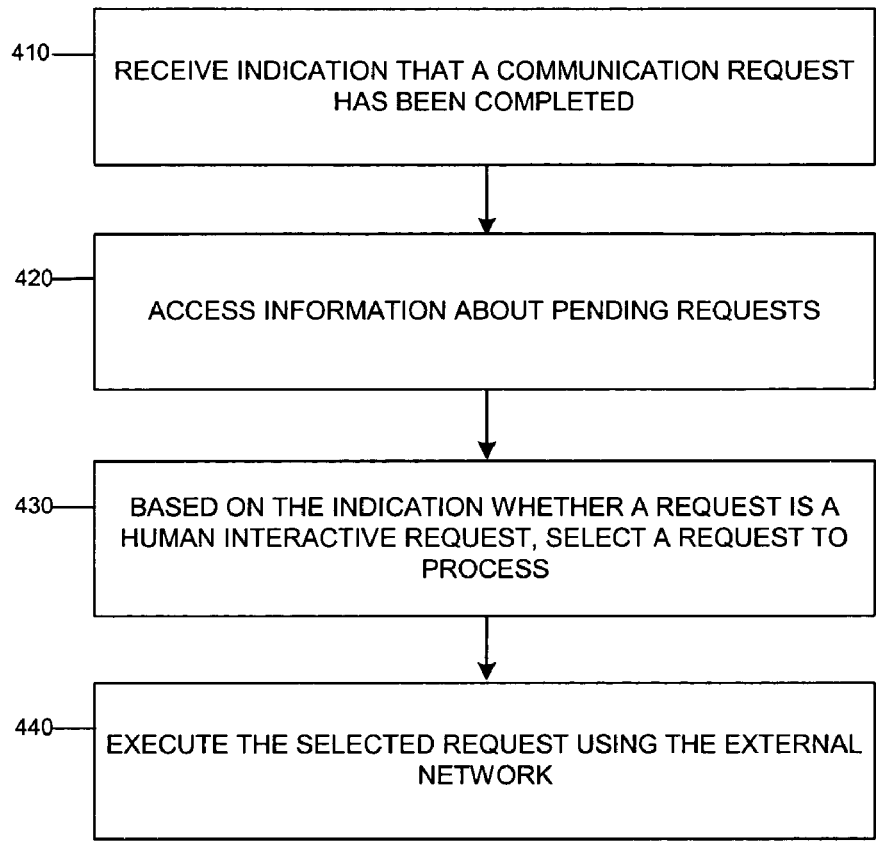

FIG. 4 shows a process 400 performed by a home-networking gateway to manage communications with a data source external to a home network. In particular, the process 400 may be executed by a home-networking gateway when communications with a data source that is external to the home network are complete, and may be used for selecting a next request to process from among multiple requests.

The process 400 begins when the home-networking gateway receives an indication that a communication request from a device in the home network to access an external computer system has been completed (step 410). In response, the home-networking gateway accesses information about pending communication requests (step 420). The information about pending communication requests includes an indication as to whether a request is a human interactive request. The information may be accessed from storage on the home-networking gateway. The information also may be accessed from storage that is accessible to the home-networking gateway but is not located on the home-networking gateway itself. The information about pending requests may include, for example, the request itself, an indication of whether the request is a human interactive request, the client device from which the request came, and the time at which the request was received.

Based on which pending requests are human interactive requests, the home-networking gateway selects one of the pending requests for processing (step 430). The home-networking gateway selects a human interactive request before selecting a request that is not a human interactive request. When more than one human interactive request is waiting to be processed, the home-networking gateway may use one of several techniques to choose from among the multiple human interactive requests. For example, the home-networking gateway may select the human interactive request that was received first. This may be accomplished, for example, by comparing the time at which the requests were received and selecting the oldest request.

Other techniques to select a particular request to process also may be used. For example, the home-networking gateway may use two queues to store communication requests that have been received and have not been processed. One queue may be used for human interactive requests, and may be referred to as a human interactive queue. The other queue may be used for requests that are not human interactive requests, and may be referred to as a download queue. When a request to access an external computer system is received, the request is added to either the human interactive queue or the download queue based on the determination of the home-networking gateway as to whether the request is a human interactive request, as described previously with respect to FIGS. 1-3. To select a particular request to process, the home-networking gateway selects the next request in the human interactive queue. When there are no waiting requests in the human interactive queue, the home-networking gateway selects the next request in the download queue.

Some implementations may permit a user to prioritize human interactive requests based on characteristics other than when the request is received by the home-networking gateway. For example, the type of device from which the request was received may be used to prioritize human interactive requests. In one example, a human interactive request from a web browser may be processed before a request from a gaming device.

Additionally or alternatively, some implementations may permit the prioritization of download requests based on a characteristic other than when the request was received by the home-networking gateway. For example, an indication of a date and time by which the entertainment content is needed may be associated with the request and used to prioritize the download requests. In one example, a request for a movie that is needed by a time in the evening of a particular date is processed before a request for a song that is not needed until after the particular date and time.

In some implementations, a user may select characteristics that are used to prioritize the processing of communication requests. This may be accomplished, for example, when a user uses a user interface to associate a priority order with each of several types of communication requests. A predetermined list of types of communication requests may be presented. These types of communication requests may include, for example, requests initiated from a browser that do not identify computer systems that provide downloadable content, voice communication requests, communication requests from a particular gaming device, and communication requests from a different gaming device.

Additionally or alternatively, a user may be able to configure different types of communication requests. This may be accomplished, for example, when a user is presented with a list of previously-identified computer systems that provide downloadable entertainment content. A user may select a priority order to be associated with each computer system. The home-networking gateway may use the priority order in selecting the next request download request to be processed.

When the request is selected (step 430), the home-networking gateway executes the selected request (step 440).

Figure 5:
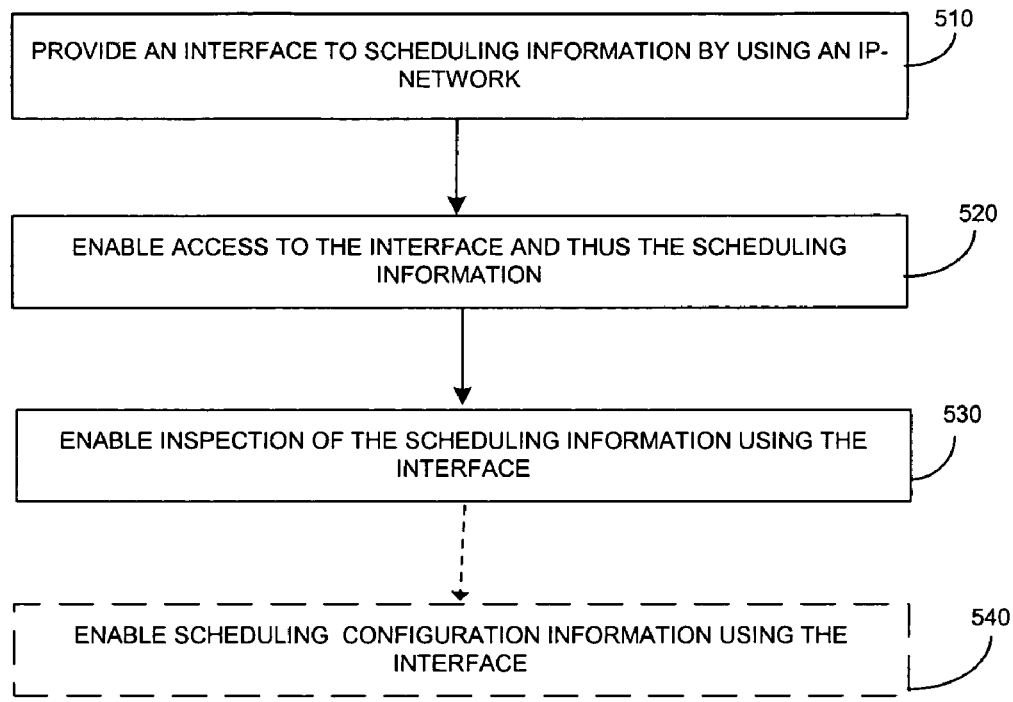
FIG. 5 is a flow chart of a process for viewing and modifying scheduling information for downloading entertainment content for use by a home-networking gateway.

FIG. 5 illustrates a process 500 for handling scheduling information for downloading entertainment content by accessing an Internet (IP) network. The process 500 generally is performed by a client device capable of accessing an IP network, such as the client 120a or 120b of FIG. 1.

The process 500 to handle scheduling information for downloading entertainment content includes using an IP network interface to provide access to the scheduling information (step 510). The scheduling information may include information that identifies the external source system where the downloadable entertainment content is accessible. The scheduling information also may include an association of the time of day and/or the day of the week at which the entertainment content should be downloaded.

The scheduling information may be stored in a table or a list that identifies one or more portions of entertainment content to be downloaded (such as a movie, a collection of songs, or a song). In some implementations, scheduling information for a portion of entertainment content may be identified using an interface that provides a calendar for the ease of identifying times, some of which may be recurring and some of which may not be recurring, during which particular entertainment content is to be downloaded.

The process 500 enables access to scheduling information for downloading entertainment content an IP interface (step 520) and enables inspection of scheduling information using the IP interface (step 530).

The process 500 also may include enabling modification of the scheduling information using the interface (step 540). The modification may include one or more of adding, deleting, or updating user-selectable options.

Although FIGS. 1-4 illustrate a home-networking gateway communicating with external computer systems, the techniques and concepts also may be applicable to other contexts. In one example, the techniques and concepts may be applicable to using a home-networking gateway to manage communications with multiple services on one computer system that is external to the home network or multiple services provided by one Internet service provider or other type of host system. In another example, the techniques and concepts may be applicable to peer-to-peer communications. For example, a user may send photographs or video from a computing device located outside the home to the home network. This may occur, for example, when one member of a household is on vacation and sends vacation photographs or video for viewing by another family member. In such a case, the human-interactive process is given priority.

Although the techniques and concepts have been illustrated in the context of controlling communications from an external computer system to a home-networking gateway, the techniques and concepts also may be applicable to using a home-networking gateway to control communications in a home network. This may be particularly true when the home network uses a shared communications pathway, such as a wireless communications pathway. By way of example, a movie may be streamed to a television set for viewing from a storage device wirelessly connected to the home-networking gateway. The streaming of the movie for immediate watching is a human interactive process that is given priority by the home-networking gateway over other processes occurring in the home-network, such as the file transfer from the storage device of the home-networking gateway to a personal computer.

It will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for regulating the transfer of entertainment content, the method comprising:

receiving, at a networking device that facilitates the exchange of content between at least first and second devices on a network and first and second external computer systems that are not on the network and from the first device over an internal communication pathway on the network between the first device and the networking device, a first request for entertainment content from the first external computer system;

determining, at the networking device, that the first request is a non-human interactive request;

in response to receiving the first request for entertainment content, initiating a transfer of at least one portion of the requested entertainment content from the first external computer system to the networking device, wherein the requested entertainment content is separated into portions for the transfer;

receiving, at the networking device and from the second device over an internal communications pathway on the network between the second device and the networking device, a second request for content from a second external computer system, the second external computer system being different from the first external computer system;

determining, at the networking device, that the second request is a human interactive request;

in response to receiving the second request for content, initiating a transfer of the requested content from the second external computer system to the networking device; and based on the determination that the second request is a human interactive request and the determination that the first request is a non-human interactive request, using the networking device to adjust one or more connection parameters between the networking device and the first external computer system in a manner that prioritizes the transfer of the requested content from the second external computer system to the networking device relative to the transfer of the requested entertainment content from the first external computer system to the networking device by increasing the period of time between receiving the at least one portion of the requested entertainment content at the networking device and transmitting an acknowledgement from the networking device to the first external computer system in response to receiving the at least one portion of the requested entertainment content from the first external computer system.

2. The method of claim 1 wherein determining that the second request is a human interactive request comprises determining that the second request is a human interactive request based on content of the second request.

3. The method of claim 1 wherein determining that the second request is a human interactive request comprises determining that the second request is a human interactive request based on a format of the second request.

4. The method of claim 1 wherein determining that the second request is a human interactive request comprises determining that the second request is a human interactive request based on the device that sent the second request.

5. The method of claim 1 further comprising:
requesting transmission of the requested entertainment content from the first external computer system;
receiving the entertainment content from the first external computer system;
storing the entertainment content on a data storage unit of a home-networking gateway; and
transmitting the entertainment content to the first device in response to the first request for transmission of the entertainment content.

6. The method of claim 1 wherein using the networking device to adjust one or more connection parameters between the networking device and the first external computer system in a manner that prioritizes the transfer of the requested content from the second external computer system to the networking device relative to the transfer of the requested entertainment content from the first external computer system to the networking device comprises increasing the period of time between receiving a portion of the requested entertainment content from the first external computer system at the networking device and sending an acknowledgement of receipt of the portion of the requested entertainment content from the networking device to the first external computer system.

7. The method of claim 6 further comprising reducing, when the transfer of content from the second external computer system to the networking device is complete, the period of time between receiving the portion of the requested entertainment content and sending the acknowledgement of receipt of the portion of the requested entertainment content.

8. The method of claim 1 wherein using the networking device to adjust one or more connection parameters between the networking device and the first external computer system in a manner that prioritizes the transfer of the requested content from the second external computer system to the networking device relative to the transfer of the requested entertainment content from the first external computer system to the first networking device comprises stopping the transmission of the requested entertainment content until the transfer of the requested content from the second external computer system to the networking device is complete.

9. The method of claim 1, wherein determining that the second request is a human interactive request comprises determining that the second request was generated by a human.

10. The method of claim 1, wherein the first device is the same as the second device.

11. The method of claim 1, wherein the first device is different from the second device.

12. A method for regulating the transfer of entertainment content, the method comprising:
receiving, at a networking device, a first request for entertainment content from a first external computer system;
determining, at the networking device, that the first request is a non-human interactive request;
in response to receiving the first request for entertainment content, initiating a transfer of at least one portion of the requested entertainment content from the first external computer system to the networking device, wherein the requested entertainment content is separated into portions for the transfer;
receiving, at the networking device, a second request for content from a second external computer system, the second external computer system being different from the first external computer system;
determining, at the networking device, that the second request is a human interactive request;
in response to receiving the second request for content, initiating a transfer of the requested content from the second external computer system to the networking device; and
based on the determination that the second request is a human interactive request and the determination that the first request is a non-human interactive request, using the networking device to adjust one or more connection parameters between the networking device and the first external computer system in a manner that prioritizes the transfer of the requested content from the second external computer system to the networking device relative to the transfer of the requested entertainment content from the first external computer system to the networking device by increasing the period of time between receiving the at least one portion of the requested entertainment content at the networking device and transmitting acknowledgements from the networking device to the first external computer system in response to receiving the at least one portion of the requested entertainment content from the first external computer system.

13. The method of claim 12 wherein determining that the second request is a human interactive request comprises determining that the second request is a human interactive request based on content of the second request.

14. The method of claim 12 wherein determining that the second request is a human interactive request comprises determining that the second request is a human interactive request based on a format of the second request.

15. The method of claim 12 wherein determining that the second request is a human interactive request comprises determining that the second request is a human interactive request based on a device that sent the second request.

16. The method of claim 12 further comprising:
requesting transmission of the requested entertainment content from the first external computer system;
receiving the entertainment content from the first external computer system;
storing the entertainment content on a data storage unit of a home-networking gateway; and
transmitting the entertainment content in response to the first request for transmission of the entertainment content.

17. The method of claim 12 wherein using the networking device to adjust one or more connection parameters between the networking device and the first external computer system in a manner that promotes the transfer of the requested content from the second external computer system to the networking device relative to delivery of the requested entertainment content from the first external computer system to the networking device comprises stopping transmission of the requested entertainment content to the networking device until delivery of the requested content from the second external computer system to the networking device is complete.

18. The method of claim 17 further comprising resuming, when the transfer of the requested content from the second external computer system to the networking device is complete, the transfer of the entertainment content.

19. The method of claim 12 further comprising:
based on the determination that the second request is a human interactive request, including the second request in a human interactive request queue;
receiving, at the networking device, a third request for content from a third external computer system, the third request being different from the second request;
determining, at the networking device, that the third request is a human interactive request; and
including, based on the determination that the third request is a human interactive request, the third request in the human interactive request queue, wherein using the networking device to adjust one or more connection parameters between the networking device and the first external computer system in a manner that promotes the transfer of the requested content from the second external computer system to the networking device relative to the transfer of the requested entertainment content from the first external computer system to the networking device includes using the networking device to adjust one or more connection parameters between the networking device and the first external computer system in a manner that promotes the transfer of the requested content from the second external system to the networking device and the transfer of the requested content from the third external computer system to the networking device relative to the transfer of the requested entertainment content from the first external computer system to the networking device.

20. The method of claim 12, wherein determining that the second request is a human interactive request comprises determining that the second request was generated by a human.

21. The method of claim 12, wherein:
receiving the first request for entertainment content from the first external computer system comprises receiving, from a device, the first request for entertainment content from the first external computer system; and
receiving the second request for content from the second external computer system comprises receiving, from the device, the second request for content from the second external computer system.

22. The method of claim 12, wherein:
receiving the first request for entertainment content from the first external computer system comprises receiving, from a first device, the first request for entertainment content from the first external computer system; and
receiving the second request for content from the second external computer system comprises receiving, from a second device, the second request for content from the second external computer system, the second device being different from the first device.

23. A method for regulating the transfer of entertainment content, the method comprising:
receiving, at a networking device that facilitates the exchange of content between at least a device on a network and first and second external computer systems that are not on the network and from the device, a first request for entertainment content from a first external computer system, the first request for entertainment content being generated automatically by the device without human interaction;
in response to receiving the request for entertainment content, initiating a transfer of at least one portion of the requested entertainment content from the first external computer system to the networking device, wherein the requested entertainment content is separated into portions for the transfer;
receiving, at the networking device and from the device, a second request for content from a second external computer system, the second request being generated in response to human interaction with the device, and the second external computer system being different from the first external computer system;
in response to receiving the second request for content, initiating a transfer of the requested content from the second external computer system to the networking device;
determining that the second request is a human-generated request; and
based on the determination that the second request is a human-generated request, using the networking device to adjust one or more connection parameters between the networking device and the first external computer system in a manner that prioritizes the transfer of the requested content from the second external computer system to the networking device relative to the transfer of the requested entertainment content from the first external computer system to the networking device by increasing the period of time between receiving the at least one portion of the requested entertainment content at the networking device and transmitting acknowledgements from the networking device to the first external computer system in response to receiving the at least one portion of the requested entertainment content from the first external computer system.

24. A method for regulating the transfer of content comprising:
receiving, at a home-networking gateway and from a first device on a home network serviced by the home-networking gateway, a first request for entertainment content available from a first external computer system;
determining, at the home-networking gateway, that the first request is a non-human interactive request;
in response to receiving the first request for entertainment content, initiating a first download procedure for downloading the requested entertainment content from the first external computer system to the home-networking gateway, the first download procedure involving a downloading of the requested entertainment content from the first external computer system to the home-networking gateway in a number of different portions, wherein the first external computer system transmits portions of the requested entertainment content to the home-networking gateway, the home-networking gateway transmits acknowledgements to the first external computer system of receipt of portions of the requested entertainment content in response to receiving portions of the requested entertainment content and within a period of time after receiving portions of the requested entertainment content, and the first external computer system waits to transmit a subsequent portion of the requested entertainment content until the first external computer system has received an acknowledgement of receipt from the home-networking gateway of a preceding portion of the requested entertainment content transmitted to the home-networking gateway from the first external computer system;

while the first download procedure is ongoing, receiving, at the home-networking gateway and from a second device on the home network serviced by the home-networking gateway, a second request for content available from a second external computer system, the second external computer system being different from the first external computer system;

in response to receiving the second request for content, initiating a second download procedure for downloading the requested content from the second external computer system to the home-networking gateway;

determining, at the home-networking gateway, that the second request is a human interactive request;

as a consequence of having determined that the second request is a human interactive request and having determined that the first request is a non-human interactive request and for at least some portion of time during which the second download procedure is ongoing, increasing the period of time between receiving portions of the requested entertainment content at the home-networking gateway and transmitting acknowledgements from the home-networking gateway to the first external computer system in response to receiving portions of the requested entertainment content from the first external computer system;

determining that the downloading of the requested content from the second external computer system to the home-networking gateway is complete;

storing the requested content downloaded from the second external computer system at the home-networking gateway;

in response to determining that the downloading of the requested content from the second external computer system to the home-networking gateway is complete:

transmitting the requested content stored at the home-networking gateway to the second device on the home network, and decreasing the period of time between receiving portions of the requested entertainment content at the home-networking gateway and transmitting acknowledgements from the home-networking gateway to the first external computer system in response to receiving portions of the requested entertainment content from the first external computer system, the decreased period of time being less than the increased period of time;

determining that the downloading of the requested entertainment content from the first external computer system to the home-networking gateway is complete;

storing the requested entertainment content downloaded from the first external computer system at the home-networking gateway; and transmitting the requested entertainment content stored at the home-networking gateway to the first device on the home network.

25. The method of claim 24 wherein increasing the period of time between receiving portions of the requested entertainment content at the home-networking gateway and transmitting acknowledgements from the home-networking gateway to the first external computer system in response to receiving portions of the requested entertainment content from the first external computer system slows the rate of the downloading of the requested entertainment content from the first external computer system to the home-networking gateway.

26. The method of claim 25 wherein slowing the rate of the downloading of the requested entertainment content from the first external computer system to the home-networking gateway prioritizes the downloading of the requested content from the second external computer system to the home-networking gateway relative to the downloading of the requested entertainment content from the first external computer system to the home-networking gateway.

27. A method for regulating the transfer of content comprising:

receiving, at a home-networking gateway and from a first device on a home network serviced by the home-networking gateway, a first request for entertainment content available from a first external computer system;

determining, at the home-networking gateway, that the first request is a non-human interactive request;

in response to receiving the first request for entertainment content, initiating a first download procedure for downloading the requested entertainment content from the first external computer system to the home-networking gateway;

while the first download procedure is ongoing, receiving, at the home-networking gateway and from a second device on the home network serviced by the home-networking gateway, a second request for content available from a second external computer system, the second external computer system being different from the first external computer system;

in response to receiving the second request for content, initiating a second download procedure for downloading the requested content from the second external computer system to the home-networking gateway;

determining, at the home-networking gateway, that the second request is a human interactive request;

as a consequence of having determined that the second request is a human interactive request and having determined that the first request is a non-human interactive request and before the first and second download procedures are complete, transmitting to the first external computer system from the home-networking gateway, an instruction to pause the first download procedure;

determining that the downloading of the requested content from the second external computer system to the home-networking gateway is complete;

storing the requested content downloaded from the second external computer system at the home-networking gateway;

in response to determining that the downloading of the requested content from the second external computer system to the home-networking gateway is complete:

transmitting the requested content stored at the home-networking gateway to the second device on the home network, and transmitting to the first external computer system from the home-networking gateway an instruction to resume the first download procedure;

determining that the downloading of the requested entertainment content from the first external computer system to the home-networking gateway is complete;

storing the requested entertainment content downloaded from the first external computer system at the home-networking gateway; and transmitting the requested entertainment content stored at the home-networking gateway to the first device on the home network.

* * * * *